United States Patent [19]

Wagner et al.

[11] 4,378,376

[45] Mar. 29, 1983

[54] SIMULATED MILK PROTEIN REPLACER OF IMPROVED SUSPENSION CHARACTERISTICS

[75] Inventors: Thomas J. Wagner, Hillsboro; William C. Mrazek, Jr., Mehlville, both of Mo.

[73] Assignee: Ralston Purina Company, St. Louis, Mo.

[21] Appl. No.: 223,872

[22] Filed: Jan. 9, 1981

[51] Int. Cl.³ .................... A23C 21/02; A23C 21/08
[52] U.S. Cl. ...................................... 426/41; 426/583
[58] Field of Search ................................. 426/41, 583

[56] References Cited

U.S. PATENT DOCUMENTS

| | | | |
|---|---|---|---|
| 2,585,951 | 2/1952 | Malkames | 426/41 |
| 3,642,490 | 2/1972 | Hawley et al. | 426/459 |
| 3,694,221 | 9/1972 | Hoer et al. | 426/46 |
| 3,857,966 | 12/1974 | Feldman et al. | 426/41 X |
| 3,974,294 | 8/1976 | Schwille et al. | 426/41 X |
| 4,107,334 | 8/1978 | Jolly | 426/41 X |
| 4,279,939 | 7/1981 | Cho | 426/656 X |

FOREIGN PATENT DOCUMENTS 966857  8/1964  United Kingdom ................. 426/41

*Primary Examiner*—Joseph M. Golian
*Attorney, Agent, or Firm*—Virgil B. Hill

[57] ABSTRACT

This invention relates to a simulated milk protein product, suitable as a milk replacer for young animals with excellent suspension characteristics in water. The simulated milk product is formed by enzymatically treating a slurry of vegetable components. The slurry is then heated to inactivate the enzyme followed by drying and mixing with various minerals, vitamins and fats to form a nutritionally complete milk replacer for animals having excellent suspension characteristics in water.

23 Claims, No Drawings

SIMULATED MILK PROTEIN REPLACER OF IMPROVED SUSPENSION CHARACTERISTICS

BACKGROUND OF THE INVENTION

This invention relates to a simulated milk product with improved suspension characteristics in water and a method for its production.

The raising of young animals, particularly calves, requires the feeding of milk type products in order to replace the milk the young animal would normally have available to it from its mother. Products of this type typically are casein and whey mixtures with added amounts of fats, vitamins, and minerals. The product is produced in dried form for storage purposes and can then be reslurried in water prior to feeding to the animal.

Products of this type are excellent substitutes for milk from a nutritional standpoint but are not entirely satisfactory from a functional standpoint. In this regard, many of these mixtures have poor suspension characteristics in water and will not remain suspended after mixing thereby being unsuitable for feeding. This problem has been specially pronounced when proteinaceous ingredients other than casein are employed with the whey. Typically, these ingredients include vegetable protein ingredients such as soy isolates, soy flour or concentrates and the like. These products are even more difficult to disperse in water and retain good suspension characteristics than the casein materials. To overcome these problems, a number of techniques for modification of the milk replacer either with or without vegetable protein has been proposed. While these techniques are so numerous that a specific discussion of each variation is not possible, nevertheless, most techniques generally have involved some degree of physical modification or agglomeration of the milk replacer particles to improve their dispersibility in water. Alternative techniques have generally relied upon the addition of surfactants or other materials which will improve the dispersibility of these products in water. While many of these materials have improved the dispersibility or "wet out" characteristics of these products in an aqueous medium, the suspension characteristics of these materials remains poor. In this regard, suspension characteristics of the product is intended to refer to the ability of the product to remain in suspension in an aqueous medium for an extended period of time without precipitation or coagulation of the proteinaceous solids. This functional characteristic is contrasted with the dispersibility or wet out characteristics of the product which refers to the ability of the material to readily disperse in aqueous medium at the time of mixing.

It is necessary that these products have good suspension characteristics in addition to good dispersibility in water since the products often stand for extended periods of time prior to consumption by the animal. Unless they form a uniform suspension in water they will often be unusable for feeding.

It is therefore an object of the present invention to form a simulated milk product with improved suspension characteristics in water.

It is a further object of the present invention to form a simulated milk product with improved suspension and dispersibility characteristics in water.

It is a further object of the present invention to form a simulated milk product containing a vegetable protein ingredient with improved suspension characteristics in water.

These and other objects are achieved in the present invention as will be hereinafter described.

SUMMARY OF THE INVENTION

The simulated milk protein product of the present invention is produced by a process comprising, forming a neutralized aqueous slurry of a vegetable protein material and whey, said slurry having a solids content of 3 to 50%. The neutralized slurry is then reacted with a proteolytic enzyme for a period of time sufficient to modify the proteinaceous components followed by heating of the reacted slurry in order to deactivate the enzyme thereby producing a simulated milk protein product with improved suspension characteristics in water.

While the separate modification of soy protein isolate to improve wettability in aqueous solutions has previously been proposed as described in U.S. Pat. No. 3,694,221, nevertheless, when a product of this type was combined with whey and the ingredients typically found in milk replacers of the present invention, the suspension characteristics of the milk replacer would remain poor even with the enzymatic modification of the isolate. Although the reason for this is not entirely understood, it is believed high levels of minerals and fat typically found in animal milk replacers effected the suspension characteristics of the protein in some fashion thereby reducing the effectiveness of the enzymatically modified protein as an ingredient of milk replacers.

Surprisingly, it was determined in investigating this phenomenon that if enzymatic modification of the slurry of whey and the vegetable proteinaceous material is carried out, not only does the product have good dispersibility in water but it has excellent suspension characteristics. This was an entirely unexpected result in development of the present invention thereby resulting in the present process to provide a milk protein replacer with excellent suspension characteristics in water.

DESCRIPTION OF THE PREFERRED EMBODIMENTS

The simulated milk protein product of the present invention having improved suspension characteristics comprises an enzymatically hydrolyzed mixture of a vegetable protein material and whey. The product of the present invention employs a vegetable protein material typically a soy protein material such as soy flour, soy concentrate or the most preferred ingredient, isolated soy protein. Therefore, the following process will be described with respect to soybean products and specifically soy isolate because this was the major concern for which the present invention was developed and because the present invention is particularly suited to the use of such soybean materials.

In soybean processing, whole soybeans are initially dehulled, then flaked, followed by solvent extraction to remove residual oils. This yields a solvent extracted flake which can be ground to a particular particle size to produce soy flour or can otherwise be extracted with a polar solvent, such as alcohol, to produce a concentrate having a protein level exceeding about 65% by weight. The solvent extracted soy flakes may also be added to an aqueous bath followed by the addition of an alkaline material to raise the pH above or to about 7. The material is then slurried to solubilize the protein followed by the separation of extraneous solids and precipitation of the solubilized protein with an acid at a pH of about 4.5. The precipitated protein can then be dried or otherwise treated by jet cooking techniques as described in U.S. Pat. No. 3,642,490.

The vegetable protein material employed in the present invention is then made into an aqueous suspension or slurry with dairy whey by adding water to the precipitated protein and mixing with dry whey, or alternatively the precipitate may be spray dried and blended with the liquid sweet dairy whey or the precipitate before drying may be added directly to the liquid whey. Of course, it will be apparent other methods may be used for forming the desired suspension or slurry of vegetable protein material and whey.

For purposes of explanation, the dairy whey that is specifically employed in the present invention is obtained as a by-product from dairy operations such as the production of sweet dairy cheese, e.g., cheddar cheese. It is subjected to a heating operation prior to the blending with the other materials. This type of treatment of dairy products such as whey is known and usually involves heating of the whey in an aqueous liquid at temperatures in the range of about 220°–260° F., for a short period of time to concentrate the whey. Treatment may be controlled to heat denature the protein of the whey or not heat denature protein depending on the operator's preference and the end product desired. This treatment of the whey is done prior to forming the slurry with the vegetable protein material according to the process of the present invention.

The whey is discharged from the evaporator in the form of a concentrate and may be formed into an aqueous slurry as hereinafter described. The vegetable protein material could be added directly to the concentrated whey. If the whey has been previously dried and is in a powder form, the combined product should be heated to a temperature of about 125° F., to insure complete dissolution of the whey in the water.

The combination of the vegetable protein material and dairy whey in the slurry should be controlled so that the slurry has a solids content of between about 3 and 50% by weight. It is also preferred that the slurry has a respective amount of whey of 30 to 90% by weight of the solids content and an amount of vegetable protein material of 10 to 70% by weight of the solids content. The mixture or slurry is put into suspension form by adjustment of the pH through a generally neutral range of about 5.0 to 7.0 and preferably within the range of 6.2 to 6.9 by the addition of an edible food grade alkaline reagent such as sodium hydroxide, potassium hydroxide, calcium hydroxide or magnesium hydroxide. This adjustment of the pH may be accomplished either by adjusting the pH of the vegetable protein material prior to blending with the whey or by adjusting the pH of the mixture during or after blending.

The neutralized aqueous slurry of vegetable protein material and dairy whey is then reacted with a proteolytic enzyme to modify the proteinaceous components and thereby produce a simulated milk protein product with improved suspension characteristics. The particular type of proteolytic enzyme which is suitable for use in the present invention is not critical to its practice and the fact a specific enzyme or mixtures of proteolytic enzymes may be employed to modify the proteinaceous component of the mixture of the vegetable protein material and whey. It is furthermore apparent that enzymes of various levels of activity may also be employed and the present invention is not to be limited by the specific level of activity of the enzyme employed. A particularly suitable enzyme for use in the present invention is bromelain having an activity of about 95 to 2000 BTU/gram. BTU (bromelain tyrosine unit) is defined as the quantity of enzyme which will produce 1 micromole of tyrosine per minute under the conditions of an assay for bromelain. It is apparent that the use of a proteolytic enzyme having higher or lower levels of activity is also contemplated within the scope of the present invention and will be limited only by the amount that is employed for the proteolytic reaction. In this regard, and as a typical example, the bromelain is added to the slurry of whey and vegetable protein material in an amount of 0.05 to 1.0% by weight of the vegetable protein material.

Following addition of the proteolytic enzyme the enzymatic reaction is allowed to proceed at a temperature of 68° to 149° F., and for a period of time effective to modify the proteinaceous component. While it is apparent that this period of time may vary depending on the activity of the enzyme, the temperature and other factors, nevertheless, this period of time typically will be about 15 to 120 minutes. It is also advisable to check the pH of the slurry during enzymatic hydrolysis to insure that the pH remains within the noted range for the maximum effectiveness of the enzyme employed.

Following enzymatic hydrolysis of the mixture of whey and vegetable protein material, the enzyme is deactivated by heating of the slurry to a temperature of at least about 180° F. Temperatures at or above 180° F., are usually sufficient to inactivate the enzyme. This step can also be used to destroy the trypsin inhibitor if soy flour or similar material is used. The heating step or the manner in which it is performed is not critical to the practice of the present invention and can easily be accomplished by passing the reacted slurry through a heat exchanger, a jet cooker or similar device as typically employed for the heating of food products.

Following inactivation of the enzyme, the slurry can then be homogenized or alternatively homogenization can be carried out prior to the inactivation step. In any event, homogenization insures uniformity of the slurry and provides a convenient means to pump the slurry to the heat exchanger for cooling.

The slurry is then cooled to a temperature of about 150° F. followed by drying thereof. Preferably, the slurry of the present invention is flash dried because of the uniform powdered product obtained by flash drying techniques. Spray drying is the most commonly used means of drying and preferred for the present invention.

The product produced pursuant to the above process functions as the primary protein souce in milk replacers for young animals, which contain as additional ingredients, vitamins, minerals, and fat. These products containing the simulated milk protein replacer of the present invention as the primary protein source have excellent suspension characteristics in water. It may be seen from the following examples that the product of the present invention not only has excellent dispersibility in water but remains effectively suspended therein even for periods of time that the milk replacer is normally used for feeding. As will hereinafter be noted, this is a distinct advantage in the use of the product of the present invention for the feeding of young animals with milk replacer products.

EXAMPLE 1

A simulated milk protein replacer was prepared with the following formula which included certain minerals and amino acids that would normally be added to a milk replacer for animals.

| Ingredient | Percent | lbs (dry basis) |
|---|---|---|
| Condensed Dairy Whey | 63.79 | 1841.4 |
| Isolated Soy Protein | 29.62 | 855.0 |
| Sodium Hydroxide | 0.25 | 9.22 |
| D,L-Methionine | 0.35 | 10.1 |
| Potassium Chloride | 1.61 | 46.5 |
| Tricalcium Phosphate | 1.36 | 39.3 |
| Magnesium Oxide | .01 | .3 |
| Zinc Oxide | .01 | .23 |
| Water | 3.0 | — |

The condensed dairy whey and isolated soy protein were hydrated with the water for 15 minutes to provide a slurry with a solids level of 35% by weight, at a temperature of 125° F. The pH of the slurry was adjusted to 6.8 with 50% sodium hydroxide. Following adjustment of the pH, 0.0068 gm of Bromelain having an activity of 1322 BTU/g was added to the slurry for each gram of soy protein isolate.

The enzymatic reaction was allowed to proceed at the noted temperature for 20 minutes after which the minerals in the above formula were added. The minerals were allowed to disperse for 10 minutes and the pH of the slurry was rechecked. If the pH was less than 6.7, it was readjusted to 6.8 with 50% sodium hydroxide. After 45 minutes of total elapsed hydrolysis time the slurry was pumped through a jet cooker set to operate at a temperature of 180° F. to inject steam into the slurry and heat the slurry to a temperature of 180° F. to inactivate the enzyme.

The slurry was then homogenized in a two stage homogenizer with the first stage set at 2000 psi and the second stage set at 500 psi. The slurry was cooled to a temperature of 150° F. in a heat exchanger and maintained at this temperature for spray drying.

The spray dried product was slurried by blending 1 part of product with 8 parts of water and had excellent suspension characteristics in the water even after a 15 minute standing period.

EXAMPLE 2

A simulated milk replacer was prepared with the following formula which included certain minerals and amino acids that would normally be added to a milk replacer for animals.

| Ingredient | Percent | lbs (dry basis) |
|---|---|---|
| Condensed Dairy Whey | 63.79 | 1841.4 |
| Isolated Soy Protein | 29.62 | 855.0 |
| Sodium Hydroxide | 0.25 | 9.22 |
| D,L-Methionine | 0.35 | 10.1 |
| Potassium Chloride | 1.61 | 46.5 |
| Tricalcium Phosphate | 1.36 | 39.3 |
| Magnesium Oxide | .01 | .3 |
| Zinc Oxide | .01 | .23 |
| Water | 3.0 | — |

The condensed dairy whey and isolated soy protein were hydrated with the water for 15 minutes to provide a slurry with a solids level of 38% by weight, at a temperature of 125° F. The pH of the slurry was adjusted to 6.8 with 50% sodium hydroxide. Following adjustment of the pH, 0.0008 gm of Bromelain having an activity of 1100 BTU/g was added to the slurry for each gram of soy protein isolate.

The enzymatic reaction was allowed to proceed at the noted temperature for 20 minutes after which the minerals in the above formula were added. The minerals were allowed to disperse for 10 minutes and the pH of the slurry was rechecked. If the pH was less than 6.7, it was readjusted to 6.8 with 50% sodium hydroxide. After 45 minutes of total elapsed hydrolysis time, the slurry was pumped through a jet cooker set to operate at a temperature of 180° F. to inject steam into the slurry and heat the slurry to a temperature of 180° F. to inactivate the enzyme.

The slurry was then homogenized in a two stage homogenizer with the first stage set at 2000 psi and the second stage set at 500 psi. The slurry was cooled to a temperature of 150° F. in a heat exchanger and maintained at this temperature for spray drying.

The spray dried product was slurried by blending 1 part of product with 8 parts of water and had excellent suspension characteristics.

EXAMPLE 3

A simulated milk replacer was prepared with the following formula which included certain minerals and amino acids that would normally be added to a milk replacer for animals.

| Ingredient | Percent | lbs (dry basis) |
|---|---|---|
| Condensed Dairy Whey | 63.79 | 1841.4 |
| Isolated Soy Protein | 29.62 | 855.0 |
| Sodium Hydroxide | 0.25 | 9.22 |
| D,L-Methionine | 0.35 | 10.1 |
| Potassium Chloride | 1.61 | 46.5 |
| Tricalcium Phosphate | 1.36 | 39.3 |
| Magnesium Oxide | 0.01 | 0.3 |
| Zinc Oxide | 0.008 | 0.23 |
| Water | 3.0 | — |

The condensed dairy whey and isolated soy protein were hydrated with the water for 15 minutes to provide a slurry with a solids level of 36.5% by weight, at a temperature of 125° F. The pH of the slurry was adjusted to 6.8 with 50% sodium hydroxide. Following adjustment of the pH, 0.009 gm of Bromelain having an activity of 95 BTU/g was added to the slurry for each gram of soy protein isolate.

The enzymatic reaction was allowed to proceed at the noted temperature for 20 minutes after which the materials in the above formula were added. The minerals were allowed to disperse for 10 minutes, and the pH of the slurry was rechecked. If the pH was less than 6.7, it was readjusted to 6.8 with 50% sodium hydroxide. After 45 minutes of total elapsed hydrolysis time, an additional 0.002 gm of Bromelain having an activity of 95 BTU/g was added to the slurry for each gram of soy protein isolate, and allowed to react for an additional 15 minutes. The slurry was pumped through a jet cooker set to operate at a temperature of 180° F., to inject steam into the slurry and heat the slurry to a temperature of 180° F. to inactivate the enzyme.

The slurry was then homogenized in a two stage homogenizer with the first stage set at 2000 psi and the second stage set at 500 psi. The slurry was cooled to a temperature of 150° F. in a heat exchanger, and maintained at this temperature for spray drying.

The spray dried product was slurried by blending 1 part of product with 8 parts of water and had excellent suspension characteristics in the water.

EXAMPLE 4

In order to evaluate and compare the suspension characteristics of the product of the present invention to other materials, the following test was employed for measuring the suspension characteristics of these materials in water.

Equipment and Materials

1. Balance—0.1 gm or better sensitivity
2. Hi-Speed Blender with Stainless Steel Blender Assembly—360 ml total capacity, with variable speed transformer.
3. Graduated Cylinder—250 ml
4. Timer
5. Distilled Water

Procedure

1. Weigh 25 gm of a representative sample of the material.
2. Measure 200 ml of distilled water at 100° F., into the blended jar.
3. Begin blending at a very low speed and add the sample slowly over a period of about 1 minute. Adjust the blender speed to disperse the sample while minimizing foaming.
4. After all of the sample has been added, continue blending for 1 minute at low speed.
5. Immediately transfer the contents of the blender to a 250 ml graduated cylinder.
6. Allow the sample to stand undisturbed for one hour or overnight. (If overnight store with refrigeration)
7. Record the volume of each layer in ml and calculate the percentage of total volume it represents.

Typically, the material will separate into three layers, the top layer with those particles that will float, the intermediate layer with those particles that are in suspension and the bottom layer with those particles which sink or are sedimentary in nature. For example, assuring a total volume of 210 ml, a float layer of 1 ml, a suspension layer of 200 ml, and a sediment layer of 9 ml, then.

$$\text{Percent layer} = 100 \times \frac{\text{volume of individual layer}}{\text{total volume}} \text{ or}$$

$$\text{Float layer} = \frac{1 \text{ ml}}{210 \text{ ml}} \times 100 = 0.5\%$$

$$\text{Suspension layer} = \frac{200 \text{ ml}}{210 \text{ ml}} \times 100 = 95.2\%$$

$$\text{Sediment layer} = \frac{9 \text{ ml}}{210 \text{ ml}} \times 100 = 4.3\%$$

The above procedure provides an objective measurement of the suspension characteristics of various proteinaceous materials.

The above procedure was applied to the following samples of Products.

| Sample | Product |
|---|---|
| A | Dry Blend of 70% sweet dairy whey and 30% enzymatically hydrolyzed soy isolate produced as in U.S. Pat. No. 3,694,221. |
| B | Dry blend of 70% sweet dairy whey and 30% soy isolate produced in accordance with U.S. Pat. No. 3,642,490. |
| C | Dried product produced according to Procedure I set forth below. |
| D | Dried product produced according to Procedure II set forth below. |
| E-1 E-2 | Product produced according to Example 2 of the present invention. |
| F-1 F-2 | Product produced according to Example 3 of the present invention. |
| G | Product produced by process in which 78% sweet dairy whey and 18% enzymatically hydrolyzed soy protein isolate produced as in U.S. Pat. No. 3,694,221 are processed in a wet system at pH of 6.5 to yield spray dried product with a protein level of 27% on a dry basis. |
| H | Product produced by process in which 69% sweet dairy whey and 28% enzymatically hydrolyzed soy protein isolate as produced in U.S. Pat. No. 3,694,221 are processed in a wet system at pH of 6.5 to yield a spray dried product with a protein level of 35% on a dry basis. |
| I | Product produced according to the Procedure set forth in U.S. Pat. No. 4,279,930. |

Procedure I 65 lbs of sweet dairy whey and 17 lbs of 120° F. water was blended and 28.8 lbs of soy protein isolate generally produced according to U.S. Pat. No. 3,642,490 but with 0.5% lecithin added was blended therewith. The slurry was heated to 150° F. and held at that temperature for 30 minutes. The slurry was homogenized with a two stage homogenizer, with the first stage set at 2000 psi and the second stage set at 500 psi. The product was then spray dried.

Procedure II

A slurry was prepared by adding 46.1 lbs of sweet dairy whey to 14.3 lbs of 120° F. water, followed by the addition of 20.5 lbs soy protein isolate generally produced according to U.S. Pat. No. 3,642,490 but with 0.5% added lecithin. The pH was adjusted to 5.9. The slurry was heated to 150° F. and held at that temperature for 30 minutes. The product was homogenized on the two stage homogenizer with the first stage set at 2000 psi and the second stage at 500 psi. The product was collected and spray dried.

The above products were then evaluated for suspension characteristics in water according to the procedure set forth above. The suspension was evaluated after 1 hour and after standing overnight at 40° F. in a refrigerator. The results of this evaluation are set forth in Table 1 and Table 2 below.

TABLE 1

Suspension Characteristics of Various Products in Water After 1 Hour

| Sample | Sediment (ml) | Float (ml) | Suspension (ml) | Total Vol (ml) | % Sediment | % Float | % Suspension | Comments |
|---|---|---|---|---|---|---|---|---|
| A | 134 | 20 (foam) | 0 | 214 | 62.6 | 0 | 0 | *80 ml Clear |
| B | 125 | 30 | 0 | 220 | 56.8 | 13.6 | 0 | *63 ml Clear |
| C | 0 | 30 (foam) | 0 | 210 | 0 | 0 | 100 | Foamy |
| D | 134 | 15 (foam) | 0 | 216 | 62.0 | 0 | 0 | *80 ml Clear |
| E-1 | 0 | 20 (foam) | 210 | 215 | 0 | 2.3 | 97.7 | |

TABLE 1-continued

Suspension Characteristics of Various Products in Water After 1 Hour

| Sample | Sediment (ml) | Float (ml) | Suspension (ml) | Total Vol (ml) | % Sediment | % Float | % Suspension | Comments |
|---|---|---|---|---|---|---|---|---|
| E-2 | 0 | 6 (float) 20 (foam) | 210 | 216 | 0 | 2.8 | 97.2 | |
| F-1 | 0 | 6 (float) 28 (foam) | 212 | 212 | 0 | 0 | 100 | |
| F-2 | 0 | 24 (foam) | 212 | 212 | 0 | 0 | 100 | |
| G | 0 | 20 (foam) | 215 | 215 | 0 | 0 | 100 | Foamy |
| H | 0 | 7 | 212 | 219 | 0 | 3.2 | 96.8 | |
| I | 8 | 0 | 210 | 218 | 3.7 | 0 | 96.3 | |

*Clear layer was intermediate layer having no suspended particles.

TABLE 2

Suspension Characteristics of Various Products in Water After Standing Overnight

| Sample | Sediment (ml) | Float (ml) | Suspension (ml) | Total Vol (ml) | % Sediment | % Float | % Suspension | Comments |
|---|---|---|---|---|---|---|---|---|
| A | 88 | 0 | 0 | 216 | 40.7 | 0 | 0 | *128 ml Clear |
| B | 49 | 26 | 0 | 216 | 22.69 | 12.0 | 0 | *141 ml Clear |
| C | 110 | 6 | 98 | 214 | 51.4 | 2.8 | 45.7 | |
| D | 86 | 0 | 0 | 214 | 40.2 | 0 | 0 | *128 ml Clear |
| E-1 | 4 | 0 | 210 | 214 | 1.9 | 0 | 98.1 | |
| E-2 | 3 | 0 | 211 | 214 | 1.4 | 0 | 98.6 | |
| F-1 | 2 | 0 | 213 | 215 | 0.9 | 0 | 99.1 | |
| F-2 | 3 | 0 | 213 | 216 | 1.4 | 0 | 98.6 | |
| G | 60 | 0 | 154 | 214 | 28.0 | 0 | 72.0 | |
| H | 4 | 6 | 206 | 216 | 0.3 | 2.8 | 95.4 | |
| I | 12 | 0 | 204 | 216 | 5.6 | 0 | 94.4 | |

*Clear layer was intermediate layer having no suspended particles.

EXAMPLE 5

To illustrate the use of the simulated milk replacer of the present invention in the formulation of a nutritionally complete animal milk replacer, the following product is prepared.

| Ingredient | % by Weight |
|---|---|
| Simulated Milk Protein Replacer from Example 3 | 41.95 |
| Delactosed Whey | 10.0 |
| Mix of Casein, Whey and Fat (12% protein and 50% fat) | 21.64 |
| Dried Whey | 24.41 |
| Vitamins & Minerals | 2.0 |

When 1 part of the animal milk replacer is blended with 8 parts of 100° F. water and generally evaluated by the test procedure set forth in Example 4, the suspension layer is 98.6% after 15 minutes. It may therefore be seen that nutritionally complete milk replacers prepared with the mixture comprising the simulated milk protein replacer of the present invention has excellent suspension characteristics in water.

While certain features of this invention have been described in detail with respect to various embodiments thereof, it will of course, be apparent that other modifications can be made within the spirit and scope of this invention and it is not intended to limit the invention to the exact details set forth herein.

What is claimed is:

1. A method of producing a simulated milk protein product of improved suspension characteristics comprising;
   a. forming a neutralized aqueous slurry of a vegetable protein material and dairy whey, having a solids content of 3-50%,
   b. reacting the slurry with a proteolytic enzyme;
   c. heating the reacted slurry to deactivate the enzyme, thereby producing a simulated milk protein product with improved suspension characteristics in water.

2. The method of claim 1 wherein said vegetable protein material is a soy material.

3. The method of claim 2 wherein said soy material is selected from the group consisting of soy isolate, soy flour and soy concentrate.

4. The method of claim 1 wherein said slurry comprises 30 to 90% by weight of the solids of whey and 10 to 70% by weight of the solids of vegetable protein material.

5. The method of claim 1 wherein said neutralized slurry has a pH of 5 to 7.

6. The method of claim 1 wherein said neutralized slurry has a pH of 6.2 to 6.9.

7. The method of claim 1 wherein said slurry is reacted with 0.05 to 1.0% proteolytic enzyme by weight of the vegetable protein material.

8. The method of claim 1 wherein said proteolytic enzyme is bromelain.

9. The method of claim 1 including the step of blending the simulated milk protein product with vitamins, minerals, and fat to form a nutritionally complete milk replacer for animals.

10. The method of claim 8 wherein bromelain has an activity of 95 to 2000 BTU/gm.

11. A method of producing a simulated milk protein product of improved suspension characteristics comprising;
   a. forming a neutralized aqueous slurry of 10 to 70% by weight of the solids of a vegetable protein material and 30 to 90% by weight of the solids of dairy whey, said slurry having a proteinaceous solids content of 3 to 50% by weight;
   b. reacting said slurry with a proteolytic enzyme at a temperature and time sufficient to modify the proteinaceous components.

c. heating the slurry to a temperature above about 180° F., to deactivate the enzyme, thereby producing a simulated milk protein product with improved suspension characteristics in water.

12. The method of claim 11 wherein said vegetable protein material is a soy material.

13. The method of claim 12 wherein said soy material is selected from the group consisting of soy isolate, soy flour, and soy concentrate.

14. The method of claim 11 wherein said neutralized slurry has a pH of 5 to 7.

15. The method of claim 11 wherein said neutralized slurry has a pH of 6.2 to 6.9.

16. The method of claim 11 wherein said slurry is reacted with 0.05 to 1.0% proteolytic enzyme by weight of the vegetable protein material.

17. The method of claim 11 wherein said proteolytic enzyme is bromelain.

18. The method of claim 17 wherein said bromelain has an activity of 95 to 2000 BTU/gm.

19. The method of claim 11 wherein said reaction is carried out at a temperature of 68° to 149° F.

20. The method of claim 11 wherein said reaction is carried out for 15 to 120 minutes.

21. The method of claim 11 including the step of blending the simulated milk protein product with vitamins, minerals, and fat to form a nutritionally complete milk replacer for animals.

22. The product produced by the method of claim 1.

23. The product produced by the method of claim 9.

* * * * *

UNITED STATES PATENT AND TRADEMARK OFFICE
CERTIFICATE OF CORRECTION

PATENT NO. : 4,378,376

DATED : March 29, 1983

INVENTOR(S) : Thomas J. Wagner & William C. Mrazek, Jr.

It is certified that error appears in the above—identified patent and that said Letters Patent is hereby corrected as shown below:

Column 8, line 29:

"4,279,930" should read "4,279,939"

Signed and Sealed this

Twelfth Day of July 1983

[SEAL]

Attest:

GERALD J. MOSSINGHOFF

Attesting Officer

Commissioner of Patents and Trademarks